United States Patent
Li (10) Patent No.: US 10,598,920 B2
(45) Date of Patent: Mar. 24, 2020

(54) LIGHT GUIDE PLATE, BACKLIGHT ASSEMBLY, DISPLAY APPARATUS, AND CONTROL METHOD THEREOF

(71) Applicant: BOE TECHNOLOGY GROUP CO., LTD., Beijing (CN)

(72) Inventor: Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/576,694

(22) PCT Filed: Jun. 12, 2017

(86) PCT No.: PCT/CN2017/087884
§ 371 (c)(1),
(2) Date: Nov. 22, 2017

(87) PCT Pub. No.: WO2017/215546
PCT Pub. Date: Dec. 21, 2017

(65) Prior Publication Data
US 2019/0212543 A1    Jul. 11, 2019

(30) Foreign Application Priority Data
Jun. 15, 2016 (CN) .......................... 2016 1 0425297

(51) Int. Cl.
*G02B 26/00* (2006.01)
*F21V 8/00* (2006.01)
*G09G 3/34* (2006.01)

(52) U.S. Cl.
CPC ......... *G02B 26/005* (2013.01); *G02B 6/0041* (2013.01); *G09G 3/348* (2013.01); *G02B 6/0048* (2013.01); *G02B 6/0055* (2013.01)

(58) Field of Classification Search
CPC ... G02B 26/005; G02B 6/0055; G02B 6/0011
See application file for complete search history.

(56) References Cited

U.S. PATENT DOCUMENTS 9,678,267 B2    6/2017    Robinson et al.

FOREIGN PATENT DOCUMENTS

| CN | 204790254 U |   | 11/2015 |         |
|----|-------------|---|---------|---------|
| CN | 205176423   | * | 4/2016  | G02F 1/13 |

(Continued)

OTHER PUBLICATIONS

2nd Office Action dated Feb. 26, 2019 in CN201610425297.5.
(Continued)

*Primary Examiner* — Joseph P Martinez
(74) *Attorney, Agent, or Firm* — Syncoda LLC; Feng Ma (57) ABSTRACT

A light guide plate is disclosed, including a plurality of light-adjusting panels disposed on or over a light-emitting side of the light guide plate. The plurality of light-adjusting panels are arranged in an array with a gap arranged between every two adjacent light-adjusting panels, and are configured to be controllable in a transparent state or in an opaque state to thereby realize a switch between a large divergence angle or a small divergence angle. Each light-adjusting panel includes oppositely disposed first electrode and second electrode, and a light adjusting layer disposed therebetween. The light adjusting layer is configured to be in an opaque state or in a transparent state depending on whether there is an electric field between the first electrode and the second electrode. A backlight assembly and a display apparatus containing the light guide plate, as well as a control method thereof, are also disclosed.

20 Claims, 8 Drawing Sheets

(56) References Cited

FOREIGN PATENT DOCUMENTS

| CN | 205176423 U | 4/2016 | | |
|---|---|---|---|---|
| WO | 2015185083 A1 | 12/2015 | | |
| WO | WO2015185083 | * | 12/2015 | ........... G02F 1/1334 |

OTHER PUBLICATIONS

1st Office Action dated Aug. 27, 2018 in CN201610425297.5.
International Search Report and Written Opinion dated Sep. 8, 2017 in PCT/CN2017/087884.

* cited by examiner

LIGHT GUIDE PLATE, BACKLIGHT ASSEMBLY, DISPLAY APPARATUS, AND CONTROL METHOD THEREOF

CROSS-REFERENCE TO RELATED APPLICATION

The present application claims priority to Chinese Patent Application No. 201610425297.5 filed on Jun. 15, 2016, the disclosure of which is hereby incorporated by reference in its entirety.

TECHNICAL FIELD

The present disclosure relates generally to the field of display technologies, and more specifically to a light guide plate, a backlight assembly, a display apparatus, and a control method thereof.

BACKGROUND

With the economic development, the relationship between electronic devices and people's work and life has become closer and closer. At present time, there are a variety of electronic devices, such as desktop computers, notebook computers, cell phones, and electronic book readers. However, while electronic devices have brought about a lot of convenience to people, they have also brought about the leakage of personal information leak.

For example, a user may frequently use the aforementioned electronic devices in public places such as subways and buses. However, the display screens of normal electronic devices typically have a relatively large viewing angle, which is disadvantageous for keeping personal information confidential.

In current anti-peeping display technologies, a shutter-type anti-peeping film is generally disposed over the surface of a display screen so as to shrink the viewing angle of the display screen to thereby realize an anti-peeping effect. However, this type of anti-peeping technologies can only shrink the viewing angle of the display screen, and if the viewing angle of the display screen needs to be enlarged, one can only remove the anti-peeping film, which is quite inconvenient in practical use.

SUMMARY

In order to address the issues associated with current anti-peeping technologies, the present disclosure provides a backlight assembly, a display apparatus and a control method thereof.

In a first aspect, a light guide plate is disclosed. The light guide plate includes a plurality of light-adjusting panels, which are disposed on or over a light-emitting side of the light guide plate. The plurality of light-adjusting panels are arranged in an array, and a gap is arranged between every two adjacent light-adjusting panels. The plurality of light-adjusting panels are configured to be controllable in a transparent state or in an opaque state.

If in a transparent state, the plurality of light-adjusting panels can allow lights transmitting inside the light guide plate to emit out from the light-emitting side without being blocked or scattered by the plurality of light-adjusting panels such that a large divergence angle is realized.

If in an opaque state, the plurality of light-adjusting panels can cause the lights transmitting inside the light guide plate to emit out from the light-emitting side to be blocked or scattered by the plurality of light-adjusting panels such that a small divergence angle is realized.

Herein, each of the plurality of light-adjusting panels includes a first electrode and a second electrode, which are disposed to be opposing to each other. Each of the plurality of light-adjusting panels further includes a light adjusting layer, which is disposed between the first electrode and the second electrode.

Herein the light adjusting layer is configured to be in an opaque state or in a transparent state depending on whether there is an electric field between the first electrode and the second electrode.

According to some embodiments of the light guide plate, the first electrode and the second electrode are substantially in parallel to the light-emitting side of the light guide plate, and each of the first electrode and the second electrode is a transparent electrode.

According to some other embodiments of the light guide plate, the first electrode and the second electrode are substantially perpendicular to the light-emitting side of the light guide plate.

In the light guide plate, the light adjusting layer can comprise PDLC, PSLC, or a black electrowetting liquid.

In some embodiments of the light guide plate, the light adjusting layer comprises a black electrowetting liquid, which is enclosed in a box between the first electrode and the second electrode. In these embodiments of the light guide plate, each of the plurality of light-adjusting panels further includes a hydrophobic layer, which is disposed between the light adjusting layer and at least one of the first electrode and the second electrode.

According to some embodiments of the disclosure, the light guide plate has a flat side opposing to the light-emitting side, and the light guide plate further comprises a first reflecting layer, which is disposed on the flat side of the light guide plate.

The light guide plate as described above can further include a second reflecting layer, which is disposed on a lateral side opposing to a lateral light incident side.

According to some other embodiments of the disclosure, the light guide plate has a non-flat side opposing to the light-emitting side. Herein the non-flat side is configured such that lights entering into the light guide plate from the lateral light incident side thereof are guided to emit out from the light-emitting side at least via a total internal reflection at the non-flat side.

In the embodiments of the light guide plate as described above, the non-flat side can include a plurality of first sub-sides and a plurality of second sub-sides, which are disposed in an alternate manner to substantially take a form of a stair. Herein the plurality of first sub-sides are each substantially parallel to the light-emitting side, and the plurality of second sub-sides are each tilted and facing to a lateral side of the light guide plate opposing to the lateral light incident side.

In the embodiments of the light guide plate as described above, the light guide plate further includes a third reflecting layer, which is disposed on the lateral side.

In any of the embodiments of the light guide plate as described above, the plurality of second sub-sides can be parallel to one another.

In a second aspect, the present disclosure further provides a backlight assembly. The backlight assembly includes a light guide plate according to any one of the embodiments as mentioned above.

According to some embodiments of the present disclosure, the backlight assembly can further include a first light source, which is disposed on a first lateral side of the light guide plate.

The backlight assembly can further include a second light source, which is disposed on a second lateral side of the light guide plate. Herein the second lateral side is opposing to the first lateral side.

In a third aspect, the present disclosure further provides a display apparatus. The display apparatus includes a backlight assembly according to any of the embodiments of the backlight assembly as mentioned above.

The display apparatus can further include a display panel, which is disposed over a light-emitting side of the backlight assembly.

In a fourth aspect, the present disclosure further provides a method for controlling a display apparatus having a light guide plate. The light guide plate comprises a plurality of light-adjusting panels, which are arranged in an array and disposed on or over a light-emitting side of the light guide plate, and are configured to be controllable in a transparent state or in an opaque state.

The method includes the step of:

controlling a light adjusting layer in each of the plurality of light-adjusting panels to be in the transparent state during normal display or to be in the opaque state during anti-peeping display.

According to some embodiments of the method, the light adjusting layer comprises PDLC, which is disposed between a first electrode and a second electrode.

As such, the step of controlling a light adjusting layer in each of the plurality of light-adjusting panels to be in the transparent state during normal display or to be in the opaque state during anti-peeping display includes the sub-step of:

applying an electric field to the first electrode and the second electrode to thereby control the light adjusting layer to be in the transparent state during normal display or removing an electric field from the first electrode and the second electrode to thereby control the light adjusting layer to be in the opaque state during anti-peeping display.

According to some other embodiments of the method, the light adjusting layer comprises PSLC, which is disposed between a first electrode and a second electrode.

As such, the step of controlling a light adjusting layer in each of the plurality of light-adjusting panels to be in the transparent state during normal display or to be in the opaque state during anti-peeping display includes the sub-step of:

removing an electric field from the first electrode and the second electrode to thereby control the light adjusting layer to be in the transparent state during normal display or applying an electric field to the first electrode and the second electrode to thereby control the light adjusting layer to be in the opaque state during anti-peeping display.

According to yet some other embodiments of the method, the light adjusting layer comprises a black electrowetting liquid, which is disposed between a first electrode and a second electrode.

As such, the step of controlling a light adjusting layer in each of the plurality of light-adjusting panels to be in the transparent state during normal display or to be in the opaque state during anti-peeping display includes the sub-step of:

applying an electric field to the first electrode and the second electrode to thereby control the light adjusting layer to be in the transparent state during normal display or removing an electric field from the first electrode and the second electrode to thereby control the light adjusting layer to be in the opaque state during anti-peeping display.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In order to address the issues associated with existing anti-peeping display technologies as described above, the present disclosure provides a backlight assembly, a display apparatus, and a method for controlling the display apparatus.

In a first aspect, a light guide plate and a backlight assembly are disclosed herein.

Figure 1:
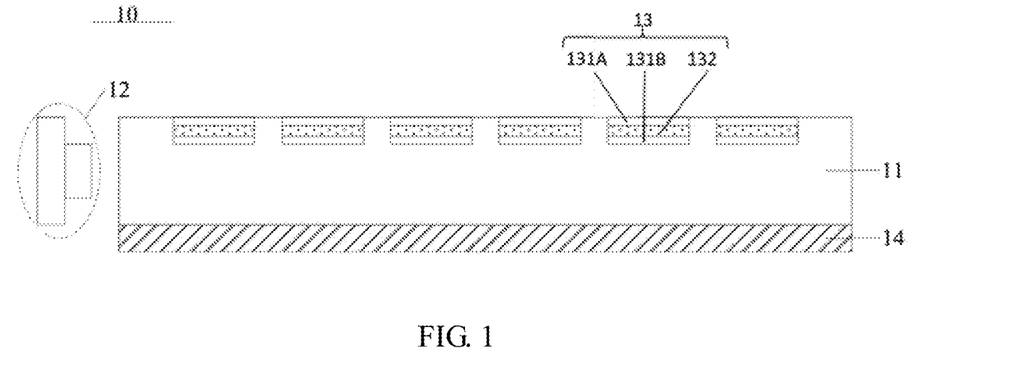
FIG. 1 is structural diagram of a backlight assembly according to some embodiments of the present disclosure.
Figure 2:
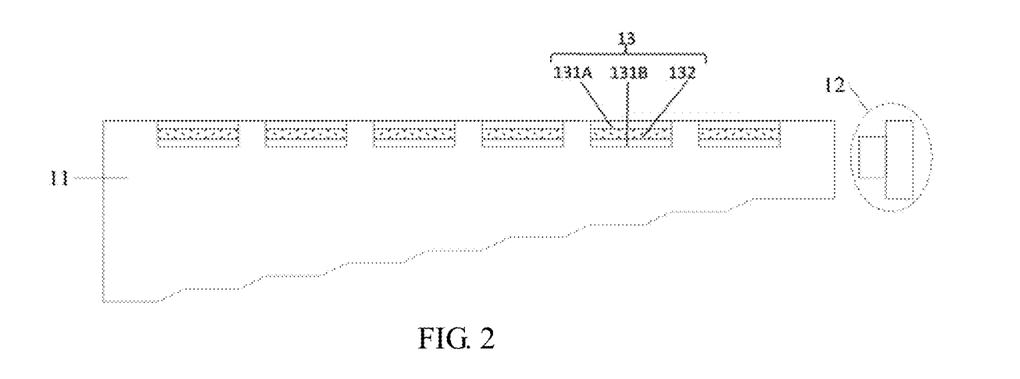
FIG. 2 is structural diagram of a backlight assembly according to some other embodiments of the present disclosure.

FIG. 1 and FIG. 2 illustrate a backlight assembly 10 according to some embodiments of the present disclosure. As shown in FIG. 1 and FIG. 2, the backlight assembly 10 comprises a light guide plate 11, and a light source 12. The light source 12 is disposed next to an outer surface of at least one side of the light guide plate 11.

The backlight assembly 10 further comprises a plurality of light-adjusting panels 13, arranged in an array, and are disposed on a surface of a light-emitting side of the light guide plate 11.

Each light-adjusting panel 13 comprises two electrodes 131 (i.e., a first electrode 131A and a second electrode 131B) and a light adjusting layer 132. The two electrodes 13 are disposed opposing to each other (i.e. the first electrode 131A is disposed opposing to the second electrode 131B), and the light adjusting layer 132 is disposed between the first electrode 131A and the second electrode 131B. The light adjusting layer 132 is configured to be in an opaque state or in a transparent state according to whether there is an electric field between the two electrodes 131 (i.e. the first electrode 131A and the second electrode 131B).

Figure 3A:
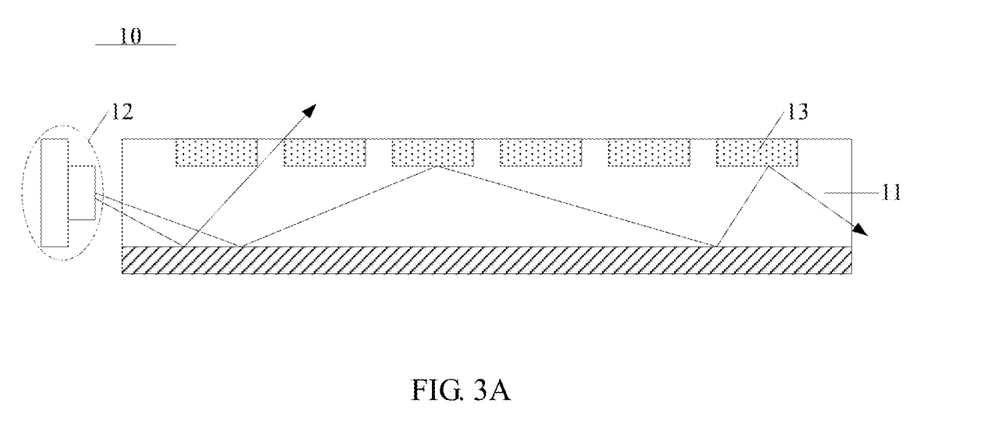
FIG. 3A is light path diagram of a backlight assembly according to some embodiments of the present disclosure when the light adjusting layer is in an opaque state.
Figure 4A:
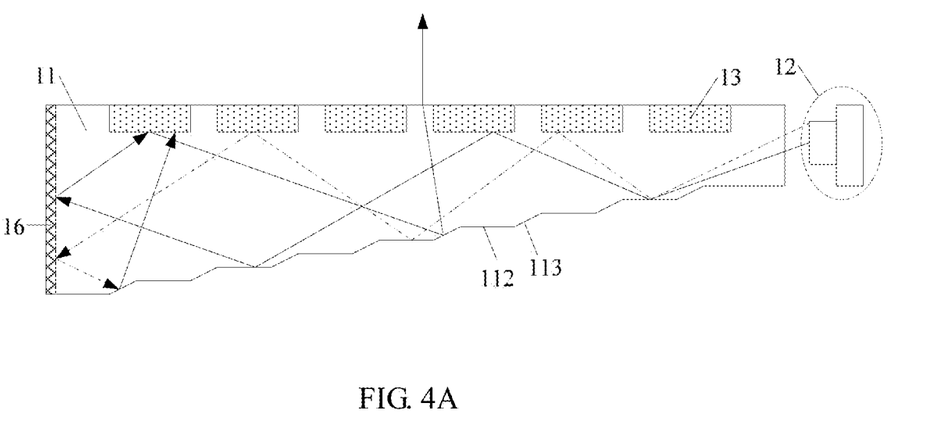
FIG. 4A is light path diagram of a backlight assembly according to some embodiments of the present disclosure when the light adjusting layer is in opaque state.

As shown in FIG. 3A and FIG. 4A, when the light adjusting layer 132 is in an opaque state, the light emitted by the light source 12 can only emit from the gaps between the light-adjusting panels 13. As such, when the backlight assembly 10 as described above is utilized in a display apparatus, the light emitted from the backlight assembly 10 to a display panel of the display apparatus has a relatively small divergence angle, resulting in a reduced viewing angle for the display apparatus to thereby realize an anti-peeping effect.

Figure 3B:
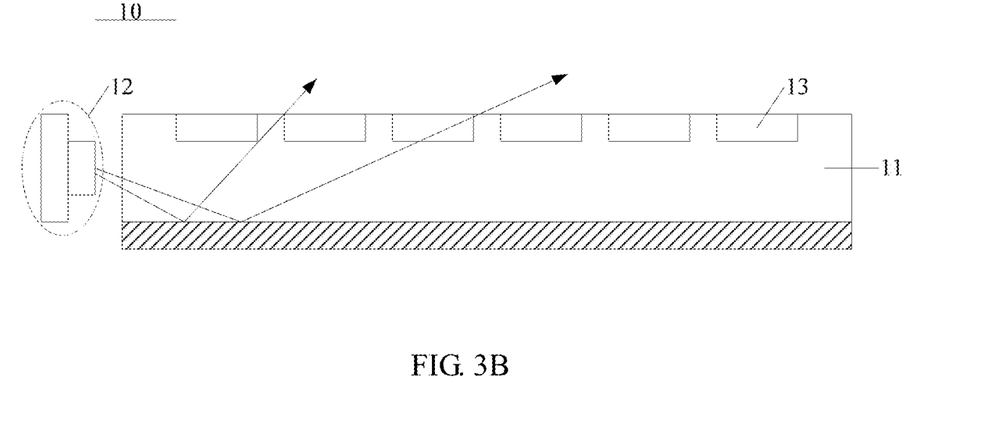
FIG. 3B is light path diagram of a backlight assembly according to some embodiments of the present disclosure when the light adjusting layer is in a transparent state.
Figure 4B:
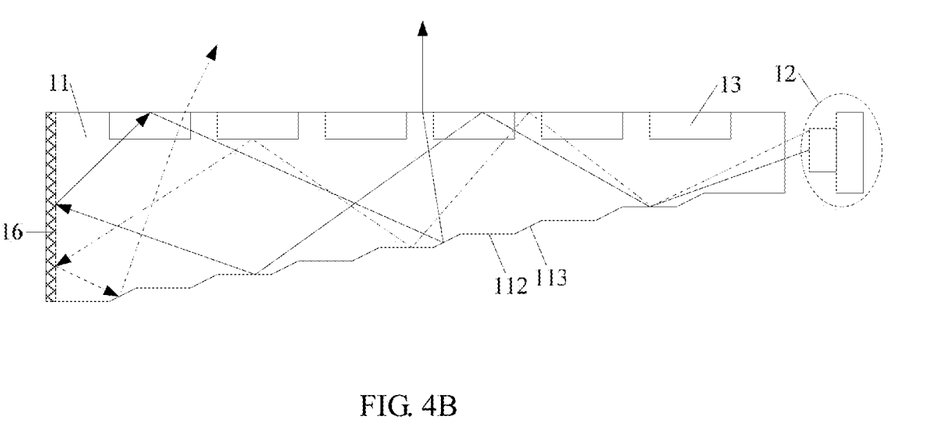
FIG. 4B is light path diagram of a backlight assembly according to some embodiments of the present disclosure when the light adjusting layer is in transparent state.

On the above basis, if the anti-peeping effect is unwanted, as shown in FIG. 3B and FIG. 4B, the light adjusting layer 132 can be controlled to be in a transparent state. As such, the light from the light source 12 can emit from the whole light-emitting side of the light guide plate 11, and consequently the light of the backlight assembly 10 emitted to the display panel has a relatively large divergence angle, resulting in a wide viewing angle for the display apparatus.

The following are noted.

First, in order for the light from the light source 12 to the light guide plate 11 can emit from the light-emitting side of the light guide plate 11, in one aspect, the shape of the light guide plate 11 can be designed in a way such that the light can be guided out only through the light guide plate 11, and in another aspect, the light can be guided out by adding a light reflecting layer.

On the above basis, the number of the light sources 12 can be configured based on the approaches whereby the light guide plate 11 guides the light out. There are on limitations herein.

Second, the width of the gaps between the light-adjusting panels 13 should be configured such that if the plurality of light-adjusting panels 13 are in an opaque state, the light from the backlight assembly 10 to the display panel has a relatively small divergence angle.

Herein the plurality of light-adjusting panels 13 can be disposed on an outer surface of the light-emitting side of the light guide plate 11, or on an inner surface of the light-emitting side of the light guide plate 11.

Third, with regards to the material of the light adjusting layer 132, it can be selected such that the light adjusting layer 132 is in a transparent state upon forming an electric field between the two electrode 131 (i.e. the first electrode 131A and the second electrode 131B), and is in opaque state if the electric field is removed. Alternatively, the material of the light adjusting layer 132 can also be selected such that the light adjusting layer 132 is in an opaque state upon forming an electric field between the two electrode 131 (i.e. the first electrode 131A and the second electrode 131B), and is in transparent state when the electric field is removed.

According to some embodiments of the present disclosure, the two electrodes 131 (i.e. the first electrode 131A and the second electrode 131B) can be disposed on an upper surface and a bottom surface of the light adjusting layer 132 respectively, which are in parallel to the light-emitting side of the light guide plate 11, as shown in FIG. 1 and FIG. 2.

In these embodiments of the backlight assembly, each of the two electrodes 131 (i.e. the first electrode 131A and the second electrode 131B) needs to be a transparent electrode, and as such can have a composition of ITO (Indium Tin Oxide), or IZO (Indium Zinc Oxide), etc.

In some other embodiments of the display assembly, the two electrodes 131 (i.e. the first electrode 131A and the second electrode 131B) can also be disposed over two sides of the light adjusting layer 132 that are opposing to each other (i.e. perpendicular to the light-emitting side of the light guide plate 11, not shown in the figures). In these embodiments of the backlight assembly, each of the two electrodes 131 (i.e. the first electrode 131A and the second electrode 131B) can be a transparent electrode, or a metal electrode.

In the backlight assembly 10 as described above, the plurality of light-adjusting panels 13 are disposed on a surface of the light-emitting side of the light guide plate 11, and it is further configured such that if there is an electric field formed between the first electrode 131A and the second electrode 131B in each of the plurality of light-adjusting panels 13, the light adjusting layer 132 disposed between the first electrode 131A and the second electrode 131B can be in a transparent state or an opaque state.

If the light adjusting layer 132 is in an opaque state, the light from the light source 12 can only emit though the gaps between the light-adjusting panels 13. As such, if the backlight assembly 10 is employed in a display apparatus, the divergence angle of the light of the backlight assembly 10 emitted to the display panel of the display apparatus is relatively small, the viewing angle of the display apparatus can be reduced, and the display apparatus can thereby realize an anti-peeping display.

If the light adjusting layer 132 is in a transparent state, the light from the light source 10 can emit from the whole light-emitting side of the light guide plate 11. Consequently, the divergence angle of the light from the light source 10 emitted to the display panel of the display apparatus is relatively large, and the display apparatus can thereby realize a wide viewing angle display (i.e., a normal display).

Because the anti-peeping display and the normal display can be achieved by only controlling whether to form an electric field between the first electrode 131A and the second electrode 131B, the need to add an anti-peeping film as typically required in current technologies is thus eliminated. Thus the backlight assembly 10 as described above can be widely utilized in display apparatuses.

Optionally, the light adjusting layer 132 can have a composition of PDLC (polymer dispersed liquid crystals), or PSLC (polymer-stabilized liquid crystals).

Figure 5A:
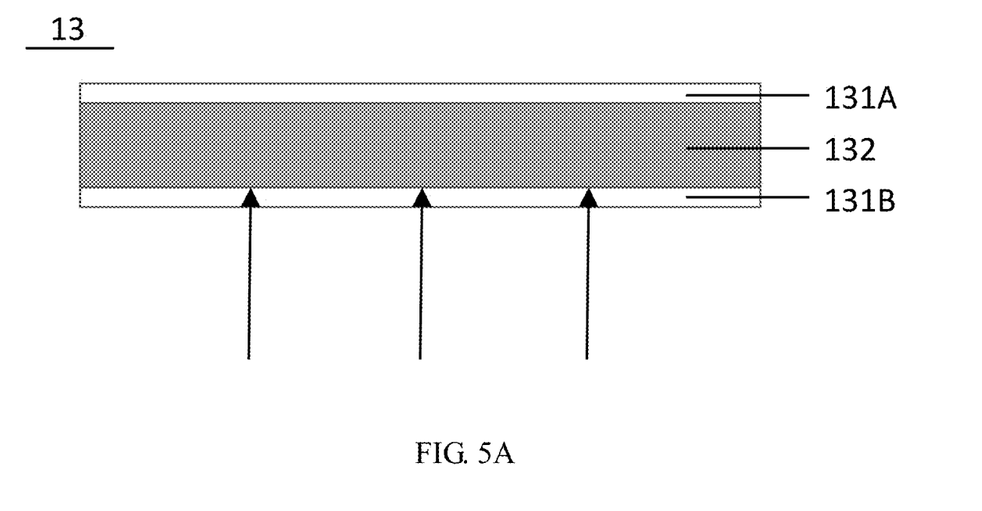
FIG. 5A is structural diagram of a light-adjusting panel according to some embodiments of the present disclosure when polymer dispersed liquid crystal (PDLC) is employed as the light adjusting layer and no electric field is applied to the electrodes.
Figure 5B:
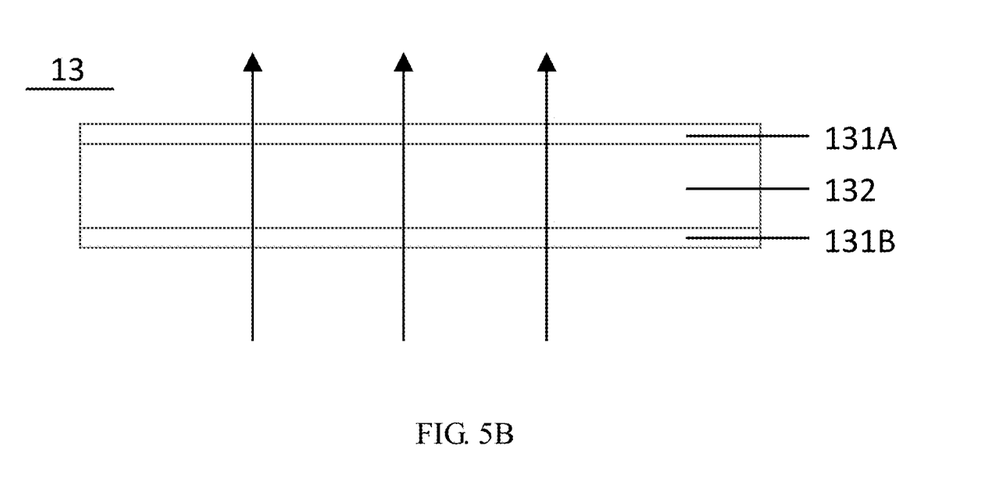
FIG. 5B is structural diagram of a light-adjusting panel according to some embodiments of the present disclosure when the polymer dispersed liquid crystal (PDLC) is employed as the light adjusting layer and an electric field is applied to the electrodes.

Specifically, as for PDLC, when there is no electric field formed between the first electrode 131A and the second electrode 131B in the light-adjusting panels 13, PDLC is in an opaque state (as illustrated in FIG. 5A); and when there is an electric field formed between the first electrode 131A and the second electrode 131B in the light-adjusting panels 13, PDLC is in a transparent state (as illustrated in FIG. 5B).

Figure 5C:
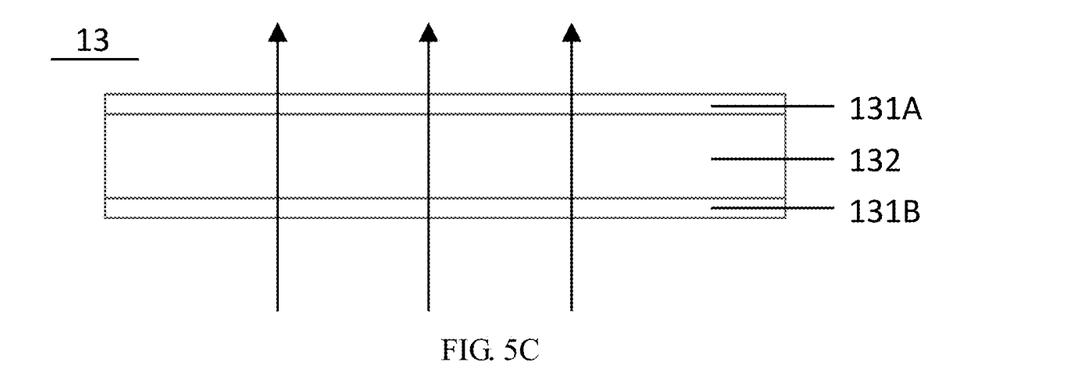
FIG. 5C is structural diagram of a light-adjusting panel according to some embodiments of the present disclosure when polymer-stabilized liquid crystal (PSLC) is employed as the light adjusting layer and no electric field is applied to the electrodes.
Figure 5D:
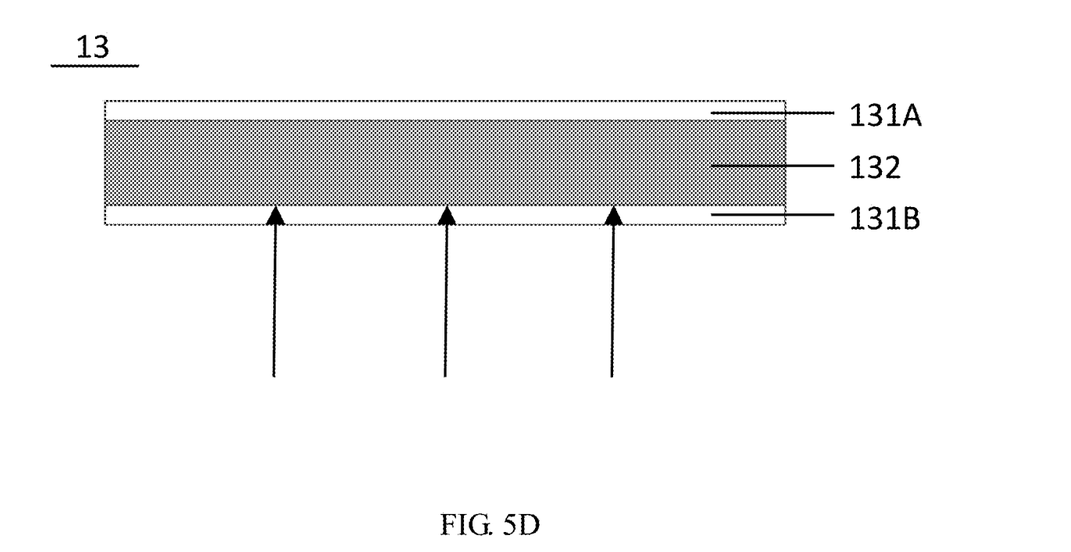
FIG. 5D is structural diagram of a light-adjusting panel according to some embodiments of the present disclosure when polymer-stabilized liquid crystal (PSLC) is employed as the light adjusting layer and an electric field is applied to the electrodes.

As for PSLC, when there is no electric field formed between the first electrode 131A and the second electrode 131B in the light-adjusting panels 13, PDLC is in a transparent state (as illustrated in FIG. 5C); and when there is an electric field formed between the first electrode 131A and the second electrode 131B in the light-adjusting panels 13, PDLC is in opaque state (as illustrated in FIG. 5D).

In the light adjusting layer 132 having a composition of PDLC, liquid crystals are dispersed in a medium of polymers in the form of liquid crystal micro-droplets having a dimension of microns or sub-microns. The liquid crystals and the polymers have substantially same contents (i.e. amount of substance, with a unit of moles), the polymers form a continuous medium, and the liquid crystal droplets are separated from one another and are dispersed in the medium of the polymers.

In an absence of an electric field, the liquid crystal micro-droplets have diverse optical axis orientations, and thus have a refractive index different than the polymers, and thus lights transmitting through the medium can be strongly scattered to thereby make the medium appear as opaque or translucent (i.e., semi-transparent). Application of an electrical field to the medium can alter the optical axis orientation of the liquid crystal micro-droplets, and when the electrical field reaches an appropriate level to thereby cause the liquid crystal micro-droplets to have a substantially same refractive index as the polymers, the medium appears as transparent.

As such, when no electric field is applied between the first electrode 131A and the second electrode 131B in the light-adjusting panels 13 having a composition of PDLC, a first portion of lights transmitting through the light-adjusting panels 13 are strongly scattered, and the light-adjusting panels 13 consequently appear as opaque or translucent (i.e., semitransparent). A second portion of lights transmitting through gaps between the light-adjusting panels 13 are not scattered to thereby transmit therethrough due to the absence of the light-adjusting panels 13 having PDLC at the gaps. Thereby, in the absence of the electrical field, the light guide plate having the light-adjusting panels can realize a small divergence angle, leading to a narrow viewing angle for the display panel.

On the other hand, when an appropriate level of electric field is applied between the first electrode 131A and the second electrode 131B in the light-adjusting panels 13 having a composition of PDLC, the first portion of lights can transmit through the light-adjusting panels 13 without being scattered, thus rendering the light-adjusting panels 13 transparent. The second portion of lights emitting through gaps between the light-adjusting panels 13 are also not scattered. Thereby, in the presence of the electrical field, the light guide plate having the light-adjusting panels can realize a large divergence angle, leading to a wide viewing angle for the display panel.

In the light adjusting layer 132 having a composition of PSLC, the content (i.e. amount of substance) of liquid crystals is much larger than the content (i.e. amount of substance) of the polymers. In the medium containing PSLC, the polymers substantially form a continuous network, and the liquid crystals exist in forms of micro-droplets, dispersed in the medium of the polymers. Due to the presence of the continuous network of the polymers in the medium, the liquid crystals form a plurality of liquid crystal mini-domains, each having the network of polymers as boundaries.

In an absence of an electric field, because of the predominant orientation of the liquid crystals due to the network of the polymers in the medium containing PSLC, lights transmitting through the medium are not scattered, causing the medium appear as transparent. Upon application of an electrical field to the medium, the orientations of the liquid crystals can alter, yet the presence of the network of the polymers influences the alteration of the orientation of the liquid crystals, resulting in a disordered orientation of the liquid crystals, which in turn cause the lights transmitting through the medium are scattered, leading to an opaque or translucent (i.e., semi-transparent) medium.

As such, when there is an electric field formed between the first electrode 131A and the second electrode 131B in the light-adjusting panels 13 having a composition of PSLC, a first portion of lights transmitting through the light-adjusting panels 13 are scattered to render the light-adjusting panels 13 opaque or translucent (i.e. semi-transparent), whereas a second portion of lights transmitting through gaps between the light-adjusting panels 13 are not scattered due to the absence of the light-adjusting panels 13. Thereby, in the presence of the electrical field, the light guide plate having the light-adjusting panels can realize a small divergence angle, leading to a narrow viewing angle for the display panel.

On the other hand, when there is no electric field formed between the first electrode 131A and the second electrode 131B in the light-adjusting panels 13 having a composition of PSLC, the first portion of lights can transmit through the light-adjusting panels 13 without being scattered, and the second portion of lights transmitting through the gaps between the light-adjusting panels 13 are also not scattered. Thereby, in the absence of the electrical field, the light guide plate having the light-adjusting panels can realize a large divergence angle, leading to a wide viewing angle for the display panel.

In the backlight assembly as described above, because PDLC and PSLC can be fabricated into films, it is relatively easier to form the light-adjusting panels 13, and as such, the manufacturing process of the backlight assembly 10 is thus relatively simpler.

Optionally, the light adjusting layer 132 can have a composition of a black electrowetting liquid. The black electrowetting liquid can be obtained, for example, by dissolving scattering particles or reflecting particles (e.g. metal particles or nano-particles) into a transparent oil such as dodecane.

In one illustrating example, each of the light-adjusting panels 13 can comprise a sealed box. The sealed box can be filled with a black electrowetting liquid, which is used as the light adjusting layer 132. The two electrodes 131 (i.e., the first electrode 131A and the second electrode 131B) can be disposed at two opposing sides of the black electrowetting liquid.

Figure 5E:
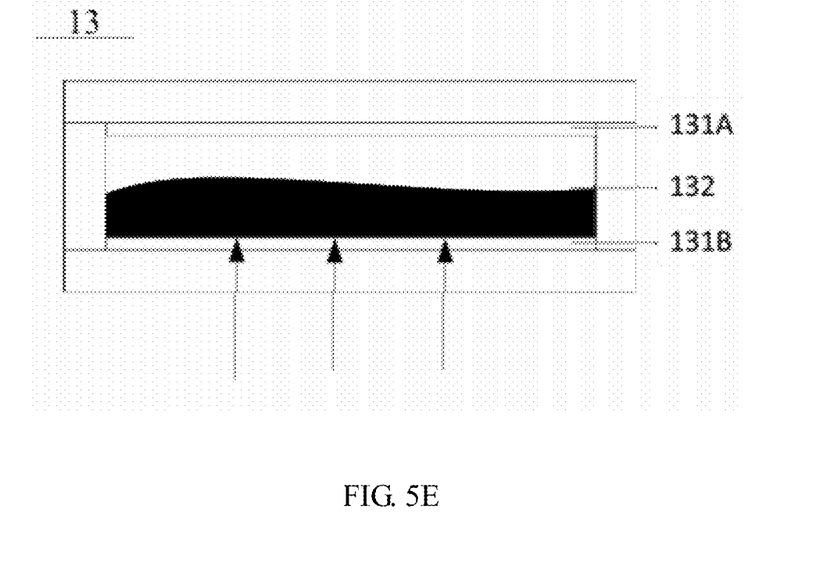
FIG. 5E is structural diagram of a light-adjusting panel according to some embodiments of the present disclosure when a black electrowetting liquid is employed as the light adjusting layer and no electric field is applied to the electrodes.

As shown in FIG. 5E, without applying an electric field to the two electrodes 131 (i.e., the first electrode 131A and the second electrode 131B), the black electrowetting liquid completely spreads out, and the light adjusting layer 132 is in the opaque state.

Figure 5F:
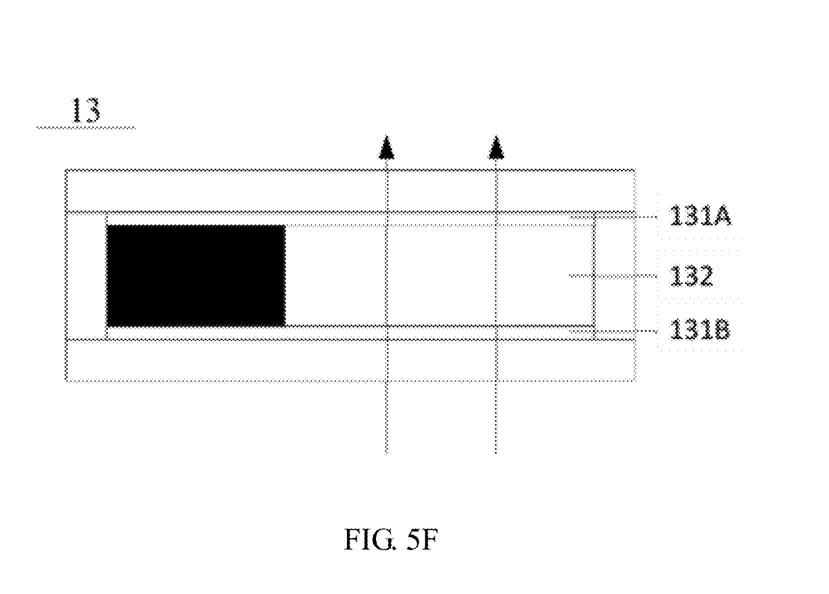
FIG. 5F is structural diagram of a light-adjusting panel according to some embodiments of the present disclosure when a black electrowetting liquid is employed as the light adjusting layer and an electric field is applied to the electrodes.

As shown in FIG. 5F, upon applying an electric field to the two electrodes 131 (i.e., the first electrode 131A and the second electrode 131B), the black electrowetting liquid converges or gathers together, the light adjusting layer 132 is in the transparent state.

Herein in order to ensure a complete spreading out of the black electrowetting liquid in the light-adjusting panel 131 when the electrodes 131 (i.e., the first electrode 131A and the second electrode 131B) are not electrically charged to thereby avoid the light from leaking, preferably, a hydrophobic layer can be disposed over at least one of the two electrodes 131 (i.e., the first electrode 131A and the second electrode 131B).

Figure 6:
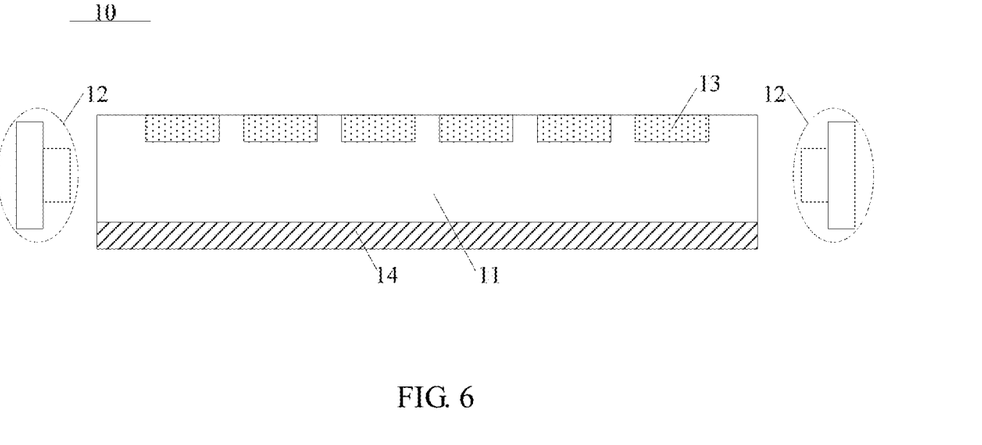
FIG. 6 is structural diagram of a backlight assembly according to some embodiments of the present disclosure.
Figure 7:
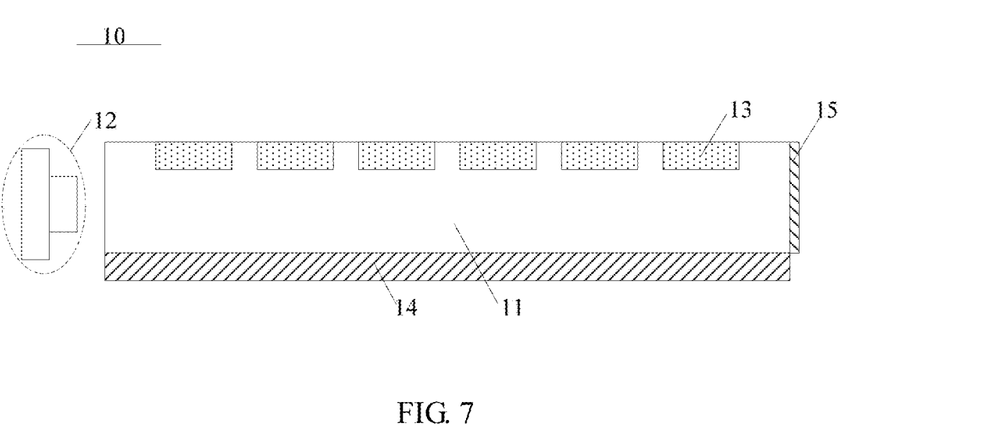
FIG. 7 is structural diagram of a backlight assembly according to some embodiments of the present disclosure.

As shown in FIG. 1, FIG. 6 and FIG. 7, the bottom side of the light guide plate 11 that is opposing to the light-emitting side can be configured to have a flat surface.

On the above basis, the backlight assembly 10 can further comprise a first reflecting layer 14, disposed over the bottom side of the light guide plate 11.

Herein, the first reflecting layer 14 can have a composition of a high-reflecting material, which can be for example, a high-reflecting metal material.

It should be noted that the shape of the light guide plate 11 can be in a shape of a flat panel, or can be in a shape of a wedge.

The light guide plate 11 according to the above embodiments of the present disclosure has a simple structure and is convenient to manufacture, thus the manufacturing cost can be reduced.

According to some other embodiments of the present disclosure, as shown in FIG. 6, a light source 12 can be disposed next to an outer surface of each of the two opposing sides of the light guide plate 11.

According to yet some other embodiments of the present disclosure, as shown in FIG. 7, a light source 12 can be disposed next to an outer surface of one side of the light guide plate 11, and the backlight assembly 10 can further comprise a second reflecting layer 15, disposed on the other side opposing to the one side of the light guide plate 11. By such configuration, the light emitted from the backlight assembly 10 can be uniform.

According to some embodiments of the present disclosure, as shown in FIG. 4A and FIG. 4B, a light source 12 is disposed next to an outer surface of one side (i.e., first side) of the light guide plate 11. The other side (i.e., second side) that is opposing to the aforementioned first side is configured to be perpendicular to a light-emitting side of the light guide plate 11. The light-emitting side is configured to be a flat side.

The bottom side that is opposing to the light-emitting side of the light guide plate 11 is provided with a plurality of first sub-sides 112 and a plurality of second sub-sides 113.

The first sub-sides 112 and the second sub-sides 113 are configured to be in an alternate manner. The second sub-sides 113 are each configured to face to the other side (i.e., the second side) and to be in a tilted manner. The first sub-sides 112 are each configured to be parallel to the light-emitting side.

Within the light guide plate 11, the light emitted from the light source 12 can be guided to the second side after a total internal reflection at the light-emitting side and a total internal reflection at the first sub-sides 112, the light can then be further guided to the second sub-sides 113 after a total internal reflection at the second side, and the light can then be reflected at the second sub-sides 113. As such, the portion of the lights that are incident on the second sub-sides 113 can deflect away from the bottom side of the light guide plate 11 to thereby emit out from the light-emitting side.

Based on this, when the light adjusting layer 132 is in the opaque state, the light reflected at the second sub-sides 113 can only emit out from the gaps between the light-adjusting panels 13 of the light-emitting side, which causes the divergence angle of the light from the backlight assembly 10 to the display panel to be relatively small.

When the light adjusting layer 132 is in the transparent state, the light reflected at the second sub-sides 113 can emit out from the whole light-emitting side, which causes the divergence angle of the light from the backlight assembly 10 to the display panel to be relatively large.

The light guide plate 11 as described above can be configured in specific shapes, and as such, the light from the light source 12 can emit from the light-emitting side of the light guide plate 11 without any light-reflecting layer configured at the bottom side of the light guide plate 11.

Furthermore, in order to avoid the situation where the light incident onto the second side partially refracts out of the light guide plate 11, in some preferred embodiments, the backlight assembly 10 can further include a third reflecting layer 16, which is disposed at the outer surface of the second side, as shown in FIG. 4A and FIG. 4B.

In addition, in order to ensure that the light reflected at the second sub-sides 113 can emit out from the light-emitting side uniformly, in some preferred embodiments, all of the second sub-sides 113 are configured to be in parallel with one another.

Because LED (light-emitting diode) has advantages such as high luminance, low heat, low power consumption, and long life, in some preferred embodiments, the light source 12 comprises an LED light panel.

Herein, the LED light panel can comprise a circuit board and a plurality of LEDs. The circuit board and the plurality of LEDs are electrically coupled, and the circuit board is configured to drive the plurality of LEDs to emit light.

Specifically, the circuit board can be, for example, a printed circuit board (PCB), or a flexible printed circuit (FPC).

In a second aspect, the present disclosure further provides a display apparatus.

Figure 8:
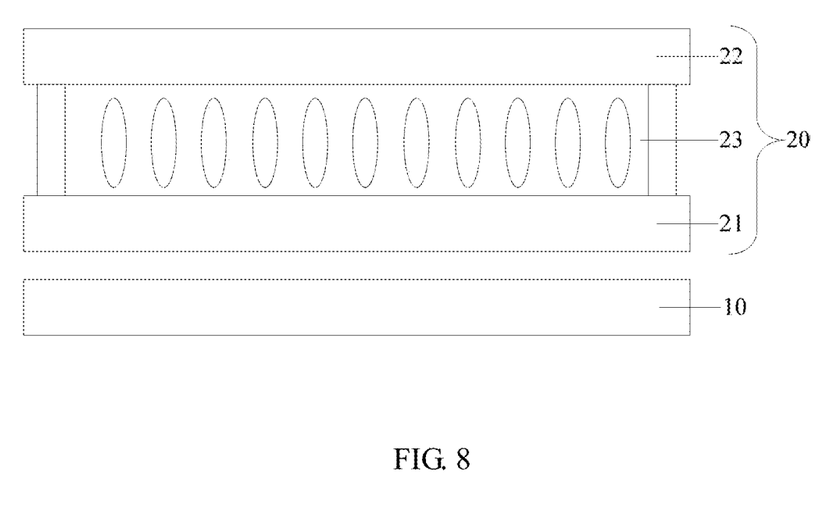
FIG. 8 is a schematic diagram of the structure of a display apparatus according to some embodiments of the present disclosure.

FIG. 8 illustrates a display apparatus according to some embodiments of the present disclosure. As shown in FIG. 8, the display apparatus comprises a display panel 20, and a backlight assembly 10 disposed over a light incident side of the display panel 20.

The display panel comprises an array substrate 21, an encasing substrate 22, and a liquid crystal layer 23 that is disposed in between.

The array substrate 21 can comprise TFTs (Thin Film Transistors), pixel electrodes that are electrically coupled to drain electrodes of the TFTs, and common electrodes.

The encasing substrate can comprise a black matrix and a color film. The color film can be disposed over the encasing substrate or over the array substrate. The common electrodes can be disposed over the array substrate or over the encasing substrate.

The display apparatus as described above can be a monitor, a television, a digital camera, a cell phone, a tablet, or a product or component that has a function of display.

In the display apparatus as described above, a plurality of light-adjusting panels 13 are disposed on a surface of the light-emitting side of the light guide plate 11 in the backlight assembly 10, and it is further configured such that the light adjusting layer 132 disposed between the two electrodes 131 (i.e., the first electrode 131A and the second electrode 131B) can be in a transparent state or an opaque state depending on whether there is an electric field formed between the two electrodes 131 (i.e., the first electrode 131A and the second electrode 131B) in each of the plurality of light-adjusting panels 13.

If the light adjusting layer 132 is in an opaque state, the light from the light source 12 can only emit though the gaps between the light-adjusting panels 13, causing the divergence angle of the light from the backlight assembly 10 to the display panel of the display apparatus to be relatively small. Consequently, the viewing angle of the display apparatus can be reduced, and the display apparatus can thereby realize an anti-peeping display.

If the light adjusting layer 132 is in a transparent state, the light from the light source 12 can emit from the whole light-emitting side of the light guide plate 11, causing the divergence angle of the light from the backlight assembly 10 to the display panel of the display apparatus to be relatively large. Consequently, the display apparatus can realize a wide viewing angle display (i.e., the normal display)

Because the anti-peeping display and the normal display can be achieved by only controlling whether to form an electric field between the electrode 131 (i.e., the first electrode 131A and the second electrode 131B), the need to add an anti-peeping film as typically required in current technologies is thus eliminated. Thus the backlight assembly 10 as described above can be widely utilized in display apparatuses.

In a third aspect, the present disclosure further provides a method for controlling the display apparatus as described above.

The method comprises the following step:

S10: controlling the light adjusting layer 132 in the backlight assembly 10 to be in a transparent state during normal display, or controlling the light adjusting layer 132 in the backlight assembly 10 to be in an opaque state during anti-peeping display.

As shown in FIG. 3B and FIG. 4B, when the light adjusting layer 132 is controlled to be in a transparent state, the light from the light source 12 can emit from the whole light-emitting side of the light guide plate 11, causing the divergence angle of the light from the backlight assembly 10 to the display panel of the display apparatus to be relatively large. Consequently, the display apparatus can realize a wide viewing angle display (i.e., the normal display).

On the other hand, when the light adjusting layer 132 is in an opaque state, the light from the light source 12 can only emit from the gaps between the light-adjusting panels 13. 3, causing the divergence angle of the light from the backlight assembly 10 to the display panel of the display apparatus to be relatively small. Consequently, the viewing angle of the display apparatus is reduced, and the display apparatus can thereby realize the anti-peeping display.

Herein, the light adjusting layer 132 can be controlled to be in transparent state or in an opaque state by configuring whether or not to apply an electric field between the two electrodes 131 (i.e., the first electrode 131A and the second electrode 131B).

Depending on the composition of the light adjusting layer 132, the above method may have the following different embodiments.

In a first embodiment of the method, the light adjusting layer comprises PDLC, which is disposed between a first electrode and a second electrode.

As such, the method according to this first embodiment includes the following step:

applying an electric field to the first electrode and the second electrode to thereby control the light adjusting layer to be in the transparent state during normal display or removing an electric field from the first electrode and the second electrode to thereby control the light adjusting layer to be in the opaque state during anti-peeping display.

In a second embodiment of the method, the light adjusting layer comprises PSLC, which is disposed between a first electrode and a second electrode.

As such, the method according to this second embodiment includes the following step:

removing an electric field from the first electrode and the second electrode to thereby control the light adjusting layer to be in the transparent state during normal display or applying an electric field to the first electrode and the second electrode to thereby control the light adjusting layer to be in the opaque state during anti-peeping display.

In a third embodiment of the method, the light adjusting layer comprises a black electrowetting liquid, which is disposed between a first electrode and a second electrode.

As such, the method according to this third embodiment includes the following step:

applying an electric field to the first electrode and the second electrode to thereby control the light adjusting layer to be in the transparent state during normal display or removing an electric field from the first electrode and the second electrode to thereby control the light adjusting layer to be in the opaque state during anti-peeping display.

Because the anti-peeping display and the normal display can be achieved by only controlling whether to form an electric field between the electrode 131, the need to add an anti-peeping film as typically required in current technologies is thus eliminated. Thus the backlight assembly 10 as described above can be widely utilized in display apparatuses.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A light guide plate, comprising a plurality of light-adjusting panels, disposed on or over a light-emitting side of the light guide plate, wherein:

the plurality of light-adjusting panels are arranged in an array, and a gap is arranged between every two adjacent light-adjusting panels; and the plurality of light-adjusting panels are configured to be controllable:
  in a transparent state to thereby allow lights transmitting inside the light guide plate to emit out from the light-emitting side without being blocked or scattered by the plurality of light-adjusting panels such that a large divergence angle is realized; or
  in an opaque state to thereby cause the lights transmitting inside the light guide plate to emit out from the light-emitting side to be blocked or scattered by the plurality of light-adjusting panels such that a small divergence angle is realized;
  wherein the light-adjusting panels are integrally formed with the light guide plate and have a flush surface with light-emitting side of the light guide plate.

2. The light guide plate of claim 1, wherein each of the plurality of light-adjusting panels comprises:
  a first electrode;
  a second electrode, opposing to the first electrode; and
  a light adjusting layer, disposed between the first electrode and the second electrode;
  wherein:
    the light adjusting layer is configured to be in an opaque state or in a transparent state depending on whether there is an electric field between the first electrode and the second electrode.

3. The light guide plate of claim 2, wherein:
  the first electrode and the second electrode are substantially in parallel to the light-emitting side of the light guide plate; and
  each of the first electrode and the second electrode is a transparent electrode.

4. The light guide plate of claim 2, wherein the first electrode and the second electrode are substantially perpendicular to the light-emitting side of the light guide plate.

5. The light guide plate of claim 2, wherein the light adjusting layer comprises PDLC, PSLC, or a black electrowetting liquid.

6. The light guide plate of claim 5, wherein the light adjusting layer comprises a black electrowetting liquid, enclosed in a box between the first electrode and the second electrode.

7. The light guide plate of claim 6, wherein each of the plurality of light-adjusting panels further comprises a hydrophobic layer, disposed between the light adjusting layer and at least one of the first electrode and the second electrode.

8. The light guide plate of claim 2, wherein the light guide plate has a flat side opposing to the light-emitting side, and the light guide plate further comprises a first reflecting layer, disposed on the flat side of the light guide plate.

9. The light guide plate of claim 8, further comprising a second reflecting layer, disposed on a lateral side opposing to a lateral light incident side.

10. The light guide plate of claim 2, wherein the light guide plate has a non-flat side opposing to the light-emitting side, wherein:
  the non-flat side is configured such that lights entering into the light guide plate from the lateral light incident side thereof are guided to emit out from the light-emitting side at least via a total internal reflection at the non-flat side.

11. The light guide plate of claim 10, wherein the non-flat side comprises a plurality of first sub-sides and a plurality of second sub-sides, disposed in an alternate manner to substantially take a form of a stair, wherein:
  the plurality of first sub-sides are each substantially parallel to the light-emitting side; and
  the plurality of second sub-sides are each tilted and facing to a lateral side of the light guide plate opposing to the lateral light incident side.

12. The light guide plate of claim 11, further comprising a third reflecting layer, disposed on the lateral side.

13. The light guide plate of claim 12, wherein the plurality of second sub-sides are parallel to one another.

14. A backlight assembly, comprising a light guide plate according to claim 1.

15. The backlight assembly according to claim 14, further comprising a first light source, disposed on a first lateral side of the light guide plate.

16. The backlight assembly according to claim 15, further comprising a second light source, disposed on a second lateral side of the light guide plate, wherein the second lateral side is opposing to the first lateral side.

17. A method for controlling a display apparatus having a light guide plate according to claim 1, wherein the method comprising:
  controlling a light adjusting layer in each of the plurality of light-adjusting panels to be in the transparent state during normal display or to be in the opaque state during anti-peeping display.

18. The method according to claim 17, wherein:
  the light adjusting layer comprises PDLC, disposed between a first electrode and a second electrode; and
  the controlling a light adjusting layer in each of the plurality of light-adjusting panels to be in the transparent state during normal display or to be in the opaque state during anti-peeping display comprises:
    applying an electric field to the first electrode and the second electrode to thereby control the light adjusting layer to be in the transparent state during normal display or removing an electric field from the first electrode and the second electrode to thereby control the light adjusting layer to be in the opaque state during anti-peeping display.

19. The method according to claim 17, wherein:
  the light adjusting layer comprises PSLC, disposed between a first electrode and a second electrode; and
  the controlling a light adjusting layer in each of the plurality of light-adjusting panels to be in the transparent state during normal display or to be in the opaque state during anti-peeping display comprises:
    removing an electric field from the first electrode and the second electrode to thereby control the light adjusting layer to be in the transparent state during normal display or applying an electric field to the first electrode and the second electrode to thereby control the light adjusting layer to be in the opaque state during anti-peeping display.

20. The method according to claim 17, wherein:
  the light adjusting layer comprises a black electrowetting liquid, disposed between a first electrode and a second electrode; and
  the controlling a light adjusting layer in each of the plurality of light-adjusting panels to be in the transparent state during normal display or to be in the opaque state during anti-peeping display comprises:
    applying an electric field to the first electrode and the second electrode to thereby control the light adjusting layer to be in the transparent state during normal display or removing an electric field from the first electrode and the second electrode to thereby control the light adjusting layer to be in the opaque state during anti-peeping display.

\* \* \* \* \*